Oct. 9, 1934.    M. MAUL    1,976,352
PERFORATING MACHINE FOR RECORDS
Filed Dec. 4, 1931    6 Sheets-Sheet 2

Inventor:
Michael Maul

Oct. 9, 1934.   M. MAUL   1,976,352
PERFORATING MACHINE FOR RECORDS
Filed Dec. 4, 1931   6 Sheets-Sheet 3

Inventor:
Michael Maul

Fig. 5

Patented Oct. 9, 1934

1,976,352

UNITED STATES PATENT OFFICE 1,976,352

PERFORATING MACHINE FOR RECORDS

Michael Maul, Berlin-Biesdorf, Germany

Application December 4, 1931, Serial No. 579,123
In Germany December 17, 1930

20 Claims. (Cl. 164—113)

The present invention relates to perforating machines for records such as record cards or record strips, and it is the main aim of the invention to represent different controlling characters symbolically by distinct hole combinations in a novel way which permits, as compared to the known systems of hole combinations, a considerable saving of paper material, or permits the representation of a considerably larger number of hole combinations upon the same card space as has been possible heretofore. In the perforated hole combinational records proposed heretofore (such as hole combinational record cards for the control of tabulating and sorting machines) the minimum of hole positions has been used which is necessary to represent a given number of distinct controlling characters by one or a plurality of holes, each hole occupying in this system a single hole position. Since for the representation of the ten numerals, also ten distinct controlling characters are necessary, the known hole combinational systems require for each controlling character provision of at least four hole positions; it is true that these four hole positions permit the representation of more than ten characters but these four positions represent the absolute minimum of hole positions for the representation of the various numerical characters by single holes and combinations of such holes because upon application of three hole positions only $2^3-1=7$ distinct perforated characters could be obtained. If it is desirable to represent according to the known systems all letters of the alphabet by distinct hole combinations, at least five hole positions are necessary and for the distinct representation of the numerical and letter characters i. e. for the representation of 36 different characters six hole positions are required.

The present invention provides a perforating machine adapted to produce perforated characters occupying less than the above mentioned known minimum of hole positions. Thereby a very considerable saving of paper material is obtained which will become quite evident if it is considered that the perforated record cards represent a mass article being used by many millions and that consequently even the least saving of paper on a single card will be multiplied correspondingly.

The perforating machine according to this invention is adapted to punch ten controlling characters representing distinctly the ten numerals within less than four hole positions, the latter being arranged in the same sense and location as in the known systems, and in a similar way thirty-six controlling characters, symbolically representing the numerals and the letters of the alphabet, may be provided within less than six hole positions; with the present invention only three hole positions are necessary for the representation of the ten numerical characters while for the thirty-six characters of the alphabet and the numerals only five hole positions are altogether required. If only the twenty-six alphabetical characters are to be represented only four hole positions are necessary upon application of the idea according to the present invention.

The aim of the present invention is obtained by means of single-positional and plural-positional holes. The following remarks will explain the terms "single-positional" and "plural-positional" holes: In the usual hole combinational systems, as for instance in the Peirce-system, in each of the hole positions (being printed upon the card or being only imaginary on certain places) one hole can be provided and in a hole combinational column a single or a plurality of holes can be produced being above each other or adjacent each other, each hole occupying however only a single hole position. If, however, two or a plurality of adjacent holes are so arranged as to form a single larger hole occupying two or a plurality of hole positions, a "plural-positional hole" is obtained. Broadly, the provision of plural-positional holes in combination with single-positional holes is not new in perforated records. However, in known machines adapted to produce controlling characters by single-positional and plural-positional holes the represented characters require even more hole positions than the combinational systems of the Peirce type and accordingly said prior records can even less compare with the invention as regards the saving of paper material than the last mentioned hole combinational systems.

It is therefore the main aim of the invention to provide a punching machine adapted to produce distinct perforated controlling characters by single-positional and plural-positional holes and combinations thereof within a lower number of hole positions than the theoretical minimum number of hole positions required when only single-positional holes are used.

A further object is to produce at least ten distinct controlling characters within only three hole positions.

A further object is to produce at least thirty-six distinct controlling characters within only five hole positions.

Still a further object is to produce at least thirty-six distinct controlling characters within only five hole positions, however at least ten of said thirty-six controlling characters occupying only three identical hole positions of said five hole positions.

Another object of the invention is to provide a machine of the type referred to having actuating members such as for instance keys adapted to control the perforation of said controlling characters.

While it is possible, as shown for instance in the prior patents for producing plural-positional holes to produce such holes by a plurality of adjacent single-positional punches or by means of intermediate punching pieces between the single hole punches proper, it is one of the further objects of the invention to use preferably for the production of single-positional holes single-positional punches and for the production of plural-positional holes solid plural-positional punches of one piece which are actuated either singly or in different combinations. By the provision of solid plural-positional punches consisting of one piece an absolutely clean cut edge of the plural-positional holes is obtained which might not be so safe with the provision of closely-arranged adjacent single-hole punches only or by the provision of intermediate punches between single-hole punches proper.

A further object is to provide plural-positional punches governing not more than two hole positions.

Another object is to provide single-positional punches of circular section and plural-positional punches of uninterrupted elongated section.

Still another object is to make provision in a machine of the type referred to having actuating members such as a set of keys that not more than a single plural-positional punch can become effective upon actuation of any key.

A further object is to provide a plurality of groups of punches each group comprising single-positional or plural-positional or both kinds of punches and controlling means adapted to select upon actuation of an actuating member any one of these groups of punches and a predetermined punch or combination of punches of said selected group.

A further object is to provide a punch carrier adapted to move one of the different groups of punches into punching position upon key actuation.

Further objects and advantages of the invention will be seen from the following specification and claims as well as from the drawings which show a preferred embodiment of the invention:

*Record card and punching stamps*

Figures 1, 10, 11:
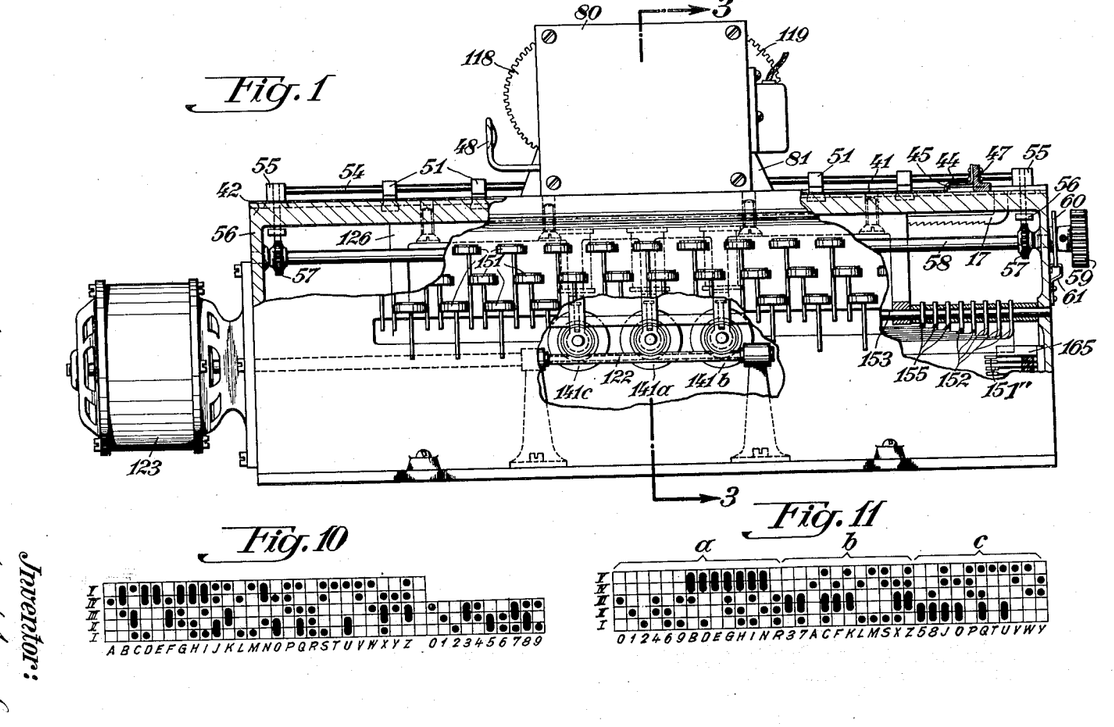
Fig. 1 shows in a reduced scale a front view of the machine, partly broken away to more clearly illustrate certain mechanisms provided within the machine.
Fig. 10 shows the key according to which the various characters are perforated by the machine.
Fig. 11 shows the same key as Fig. 10, however, in Fig. 11 the characters are arranged in three groups, the characters of each group being perforated by a separate punching stamp group.
Figure 2:
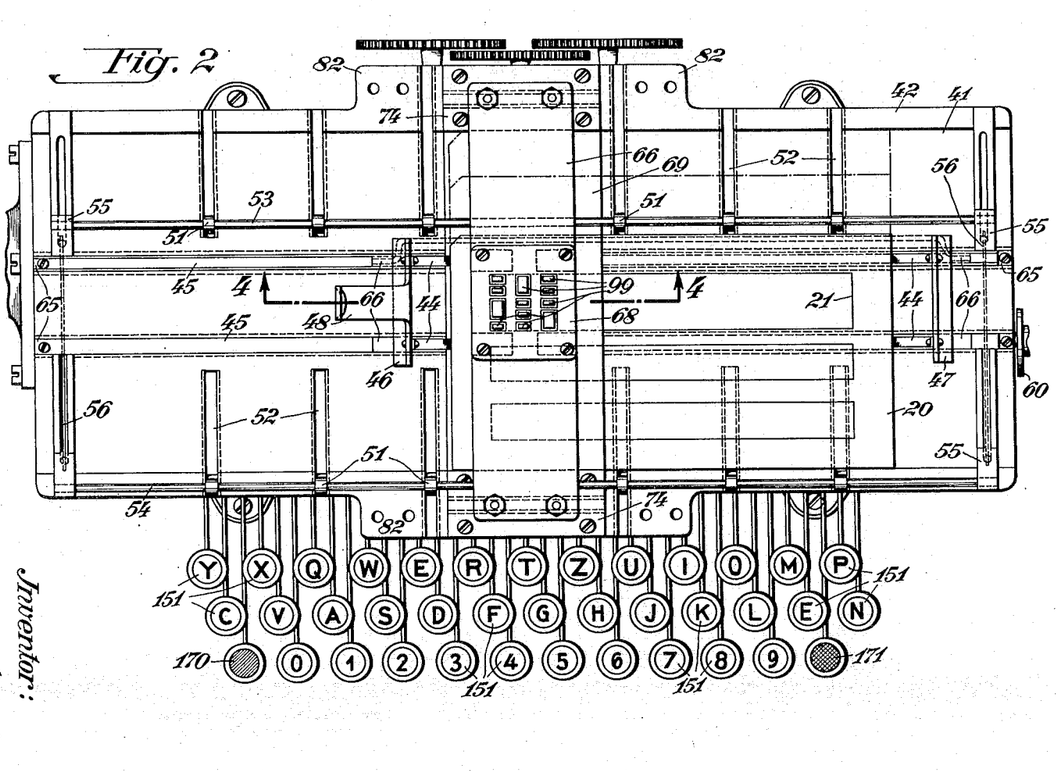
Fig. 2 is a top view of the machine wherein however the upper structure including the stamp selectors and the slide mechanism are removed in order to show the punching stamp carrier and the card feeding mechanism. In order to represent the parts within the available space as clearly as possible the scale in Fig. 2 has been chosen a little larger than in Fig. 1 and the motor and hand wheel provided on the sides of the machine have been omitted.
Figure 9:
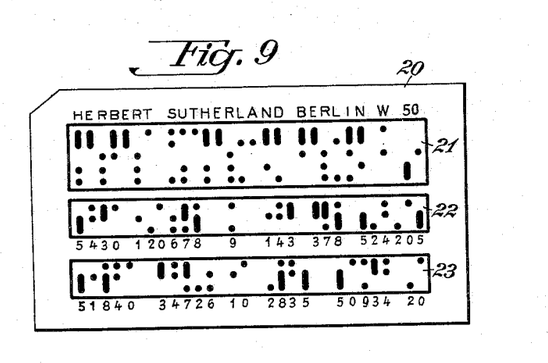
Fig. 9 shows a perforated record card punched with the present machine, the card being on the same scale as the blank card inserted in the machine in Fig. 2. In the card shown in Fig. 9 there is also entered the meaning of the hole combinations to facilitate reading of the card.

A record card 20 which has been perforated in the present machine is shown in Fig. 9 on the same scale as the blank card inserted in the machine in Fig. 2. The record card comprises three hole combinational decks 21, 22 and 23; the deck 21 indicates preferably the name and the address of a person while the decks 22 and 23 contain certain numerical data referring to the person indicated in the deck 21. Each deck comprises 30 record columns in each of which a character may be symbolically represented by perforations. Of course, the arrangement of the decks and of the columns may be made in any manner and the record card illustrated in Fig. 9 shows only a preferred arrangement. The perforations in the record card are provided according to the key in Fig. 10 from which will be seen that the various characters are represented by single-positional as well as by plural-positional holes. From this key may also be seen that each letter character requires for its representation only five hole positions being indicated at the side by I—V while for the distinct representation of the ten numerals only three hole positions are used. In Fig. 11 are the same characters indicated as in Fig. 10, however, they are divided in three different groups *a*, *b* and *c*, each group comprising certain numerals and letters as shown in Fig. 11. It will be seen that the group "*a*" of characters includes only elongated holes i. e. double-positional holes in the IV and V positions while in the positions I, II and III only round holes i. e. single-positional holes occur; in the group "*b*" of characters elongated holes occur only in the II and III positions while in all remaining positions only round holes occur, and in the "*c*" group elongated holes occur only in the I and II positions while all remaining positions may be occupied by round holes. For the perforation of the various characters are three different sets of punching stamps used, each of them being adapted to be brought selectively into punching position, depending upon the character which is to be punched.

Figure 6:
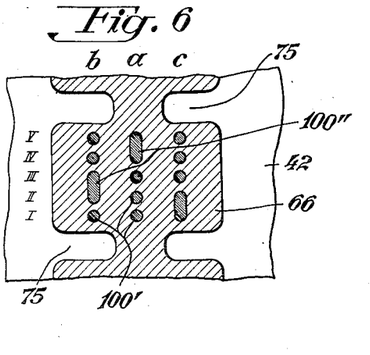
Fig. 6 is a section through the stamp carrier on line 6—6 of Fig. 4, both figures being on the same scale.

If a character of the "a"-group shall be punched, the stamp group "a" is brought into punching position (see also Fig. 6 representing a section through the punching stamp carrier) which group comprises an elongated hole stamp for the positions IV and V and round hole stamps for the positions I, II and III. If, however, a character of the "b"-group is to be perforated, the stamp group "a" according to Fig. 6 will not be used but the stamp group "b" comprising an elongated hole stamp for the II and III positions while for the remaining hole positions round-hole stamps are provided; in a similar way the stamp group "c" comprises only one elongated-hole stamp for the positions I and II while for the remaining three positions round-hole stamps are used. A comparison of the Figs. 11 and 6 will show that each character of the "a"-group can be produced by single or combinational actuation of the punching stamps of the stamp group "a" and that each character of the "b"-group can be punched by the stamp group "b" while each character of the "c"-group can be punched by the stamps of the "c"-group. Provision has further been made that the group-"a" of characters comprises 14 characters while each of the stamp groups "b" and "c" comprises 11 characters. As will still be seen from the following specification, upon perforation of a character of the "a"-group no movement of the punching stamp carrier is effected so that the stamp group "a" will remain in its normal position; since in punching machines chiefly numerals are to be perforated the stamp group "a" includes six numerical characters while each of the "b" and "c" groups includes only two numerical characters. This arrangement permits that upon perforation of numerals only in four amongst ten cases a sideward movement of the punching stamp carrier is required.

Card feeding

As has been explained in the foregoing section, the record card comprises a plurality of decks each including a number of columns. The punching stamp mechanism is now so provided that only one column of one deck can be perforated each time, and consequently provision has been made in such a way that on the one hand the columns of a deck are fed column by column past the punching stamps while on the other hand each deck can be adjusted in vertical direction relatively to the punching stamps which are common to all decks. In order to shift the card column by column past the punching stamps, an electromagnetically controlled card carriage is provided. The card to be perforated rests upon the bed 41 of the machine frame 42 (Figs. 1 and 2) and is held on both ends by arms 44 of the card carriage. If the card is in one of its end positions the angles 46 or 47 respectively are in proximity to the guide blocks 45 but do not engage the same (Fig. 2); the movement of the carriage to both sides is limited by steps 65 adapted to cooperate with stop fingers 66 of the carriage. The arms 44 slide in grooves 45 of the machine frame and are connected with one another by angles 46 and 47. The angle 46 is provided with a handle 48 to permit manual movement of the card carriage from the extreme left hand position to the extreme right hand position from which the carriage is again shifted column by column to the left during the perforating operation. In the upper groove 45 there is provided on both sides of the middle line a continuous slot. Through these slots are the angles 46 and 47 connected to end pieces carrying a shift bar 17 (Figs. 1, 2, 3 and 4) serving for the column by column shifting of the carriage. The end pieces connect the toothed bar 17 to the angles which run in sideward grooves of the upper slots 45 passing through the casing 42 so that the carriage is securely fed in vertical direction. The toothed bar 17 is controlled by an escapement 31 (Figs. 3 and 4) being under the electromagnetic control of the keys. The escapement 31 is arranged between the lips 32 and 33 and is drawn by the springs 34 and 35 upwardly in engagement with the teeth of the shift bar in such a way that normally the left tooth of the escapement 31 is in engagement with the teeth of the shift bar 17 and that the spring 34 is strong enough to counteract the tension of a spiral spring (not shown) being provided within a spring casing, said spiral spring tending to move the carriage by means of the member 36 to the left (Fig. 4) and being also adapted to counteract the spring 35 being slightly weaker. The escapement is guided by a slot and a pin 37 fastened upon the lip 32, and is drawn against the stop pin 38. If now the carriage shall be shifted for one step in order to feed the next column of the card past the punching stamps, the magnet 39 must be energized. This magnet will rock the escapement 31 in counterclockwise direction (Fig. 4) about the pivot 37 whereby the right hand tooth of the escapement 31 engages the shift bar 17, however, without permitting movement of said bar. But as soon as the magnet 31 becomes deenergized the spring 34 will again draw the escapement 31 to its home position and thereupon the left hand tooth of the escapement 31 comes just behind the peak of a tooth of the bar 17 so that the spiral spring (not shown) will draw the toothed bar 17 by means of the member 36 to the left until the next steep edge of a tooth of the bar 17 is stopped by the left tooth of the escapement 31, and then the carriage will just have been moved for one card column.

If it is not desirable to move the carriage step by step to its extreme left hand position but to release the same entirely in order to return it to its home position, the magnet 41' (Fig. 3) provided on the lip 33 will be energized which will attract its armature 40, fastened on the escapement 31, against the tension of the springs 34 and 35 so that the escapement 31 is moved downwardly and entirely out of engagement with the toothed bar 17 whereon the pins 37 and 38 (Fig. 4) serve as guides for the escapement. Thereupon the carriage will be moved under the tension of the spiral spring to its extreme left hand position.

For the vertical adjustment of one of the decks of the record card in punching position the following mechanism is provided: As will be seen from Figs. 1, 2 and 4, the card rests upon the bed 41 of the machine between the inwardly directed projections of the upper and lower guide fingers 51 extending with their dovetail-like lower ends (see Fig. 4) into the grooves 52 (Fig. 2) of the machine frame 42 in order to guide said fingers. The upper fingers 51 are connected with each other by a cross bar 53 and the lower fingers by a cross bar 54; the distance between the projections of the upper and lower fingers 51 is just large enough that the card can freely pass between the same in lengthwise direction. The bars 53 and 54 are provided on their ends with end pieces 55 which are also guided in grooves of the machine frame 42 and which are connected with toothed bars 56 (see Figs. 1, 2 and 3) by means of connecting pieces extending through slots of the frame; consequently, there is a toothed bar provided in the interior of the machine frame on each end. Each toothed bar 56 engages a gear 57. Both gears 57 are fast upon a shaft 58 rotatably mounted in the machine frame (Fig. 1) which is provided with a handwheel 59. To the handwheel 59 is a disk 60 fastened having spaced notches (Fig. 3) in which engages a strong spring 61 fastened on the outside of the right hand side of the machine and serving to secure the deck selecting mechanism in the selected position. The selection of a certain deck is effected by turning the handwheel 59. In the position shown in Fig. 2 the uppermost deck is selected for perforation and handwheel 59 is therefore so adjusted that the lower guide fingers 51 are in the lowermost position so that the card presents during its movement in lengthwise direction between the upper and lower guide fingers 51 only the uppermost deck 21 to the punching stamp mechanism which will still be described. If the uppermost deck has been perforated column by column in the manner still to be described, the handwheel 59 (Fig. 1) is turned so that the gears 57 move the toothed bars 56 upwardly (Figs. 2 and 3) whereby also the bars 53, 54 and consequently the guide fingers 51 are moved upwardly so that they will also move the card 20 being positioned between them. If the middle deck is in the proper position, the spring 61 (Figs. 1, 3) will snap into a notch of the disk 60. If after perforation of this deck column by column the lowermost deck 23 (Fig. 9) shall be punched, the guide fingers 51 are moved by means of hand wheel 59 to their uppermost position so that now the upper guide fingers 51 are on the uppermost edge (Fig. 2) of the machine frame 42. Fig. 2 shows in dotted lines the middle and upper position of the record card.

*Punching stamp mechanism*

The punching stamp mechanism includes three groups $a$, $b$ and $c$ of punches shown in Fig. 6; as has been already described, the mechanism comprises elongated-hole stamps and round-hole stamps. The stamps are mounted in a stamp carrier 66 (Figs. 3 and 4) in which their heads are pressed by springs 67 upwardly against a cover plate 68; projections 99 (see also Fig. 1) of the heads extend through slots of the cover plate beyond the latter. For a perforating operation only one of the three groups $a$, $b$ and $c$ will be selected and will be adjusted in "punching line", the punching line being the middle of Fig. 4. The punching stamp carrier 66 is fastened in the manner still to be described to a matrix plate 69 which is arranged in a recess 69' of the card bed upon the machine frame. Due to this recess, the matrix plate 69 and the punching stamp carrier have a certain play towards both sides so that they can move to the left (Fig. 4) as well as to the right hand side so far that the "b" or "c" group of punches (Fig. 6) is positioned in the middle of the Fig. 4 where these parts are then in "punching line". The casing is provided below the matrix plate 69 with a slot 70 through which the paper waste is removed through a funnel not shown in the drawings. The stamp carrier 66 and the coordinated matrix 69 extend over the whole width (see Fig. 2) of the machine so that the card may freely move between the stamp carrier 66 and the matrix plate 69 to permit the selection of the decks. As may be seen from Fig. 2 and from the section on the left side of Fig. 3, the punching stamp carrier 66 is fastened by screws 72 to the matrix plate 69 so that they form a unit and consequently also the holes of the matrix plate will always be in the correct position just opposite to the punching stamps. Each screw 72 is provided on its lower end with a head 73 (Fig. 3) being adapted to slide in grooves of the casing; the whole punching stamp mechanism is held by means of cover plates 74 on the casing. It will therefore be seen that the punching mechanism including the punching stamp carrier 66 and matrix 69 is adapted to be moved laterally in order to adjust the "b"- as well as the "c"-group of punches in punching line.

The punching stamp carrier 66 is provided with slots 74' (Fig. 3) through which the bars 53 and 54 (Fig. 2) of the deck selecting mechanism extend so that on the one hand these bars are guided by the punching stamp carrier 66 while on the other hand the punching stamp carrier does not interfere with the deck selecting means for the card. If the first or the last column of the card 20 is in punching line, the guide fingers 44 (Fig. 2) extend so far into corresponding recesses 75 of the punching stamp carrier 66 (see also Fig. 6) and of the matrix plate 69 that the first or the last column respectively is in punching line; however, the recesses 75 are so dimensioned that the punching stamp carrier can still move for one colum to the left or to the right in order to adjust the "b" or "c"-group of punches in punching line without interfering with the fingers 44.

*Selector mechanism for punching stamps and punching cams*

The perforation is controlled by the depressed key which determines the punching stamp group as well as the punches to be selected within said group. I will now describe at first the punching stamp selection and then the group selection of the punching stamps will be explained.

The selector mechanism for the punching stamps is provided upon a bridge being generally indicated at 80 (Figs. 2 and 4) and being supported by brackets 81 screwed at 82 (Fig. 2) to the machine frame. The bridge 80 is provided with a rib 83 (Figs. 3, 4 and 5) having on the right hand side three and on the left hand side two selector magnets 86. Each selector magnet is coordinated to one of the five hole positions and in accordance with the designation of the positions by Roman numerals (Fig. 10) also the selector magnets are designated in Fig. 5 by corresponding Roman numerals. To each selector magnet is a selector bar 87 coordinated extending on opposite sides through the side walls of the bridge 80 (Fig. 4). To the selector magnets 86 of the left hand side are armature arms 89 coordinated being pivotally mounted at 88 and being on their lower ends operatively connected by a pin and slot connection to the corresponding selector bars (see also Figs. 3 and 5). Each selector bar 87 is connected by a spring 90 to its armature arm 89. A spring 91 draws the arm 89 and therewith also the slide 87 to the left so that the nose 92 engages the right hand wall of the casing 80 and the parts will remain in the home position as shown in Fig. 4. To each of the three selector magnets 86 of the right hand side (Figs. 4 and 5) is an armature arm 95 coordinated being pivotally mounted at 94 which draws its coordinated selector slide 87 by means of a spring 96 to the left just in the same way as the armature arm 89 so that the corresponding nose 92 will also engage the casing 80; the coordinated selector slide will be held in its upper position by spring 90 in the same way as the selector slide of the left hand selector magnets 86. The bars 87 coordinated to the armature arms 89 are guided in slots of the left side wall of the bridge 80, said slots being open on their lower ends and the bars are normally drawn by their springs 90 against the upper edge of the slots. In the right hand side wall are the bars 87, coordinated to the armature arms 89, guided through closed slots which permit, however, play enough that the bars can tilt in these slots with their left hand ends downwardly against the tension of the springs 90. The bars 87 coordinated to the armature arms 95 are arranged just in the reverse way, i. e. they are guided in slots being open on the right hand side and being closed on the left hand side so that said armature arms can tilt with their right hand end downwardly against the tension of springs 90. Each selector slide 87 is provided with a lip 98 which normally lies between the heads 99 of the middle and the left hand group of punching stamps. If, however, one of the selector magnets 86 is energized the coordinated slide 87 will be moved through the arm 89 or 95 respectively so far to the right that the lip 98 will be adjusted in punching line. To each selector slide 87 is a normally open contact 199 coordinated which is closed as soon as the selector slide is moved from its home position to the right.

The punching operation is effected by means of cam 102′ fastened upon a shaft 101 which revolves once in each punching cycle; if the peak of the cam 102′ encounters the bars 87, all bars will be moved simultaneously downwardly; the bars coordinated to the left magnets 86 (Fig. 4) are moved downwardly with their left hand ends and the bars coordinated to the right hand magnets 86 are moved with their right hand ends downwardly while the opposite end of each bar forms the pivot or tilting point. Those bars 87 which consequently to the energization of their magnets 86 were moved to the right will encounter upon their downward movement with their lips 98 the heads 99 of the punching stamp group being in punching line, and the corresponding selected punches will be pressed downwardly through the card while the lips 98 of the bars 87 which have not been moved from their home position lie always in the free space to the left of the heads 99 of the punching stamp group being in punching position, and consequently the punching stamps below said bars will not be actuated. Upon the depression of the bars 87 the same will move against the action of the springs 90 with their pins in the slots of the armature arms 89 or 95 respectively.

*Slide mechanism for punching stamp carrier*

From the preceding specification it will be seen that in each punching operation in addition to the selection of the position of the punching stamps, also a selection of one of the three groups a, b or c of punching stamps is effected and the selected group will be adjusted in punching line. If a character of the a-group (see Figs. 11, 4 and 6) is to be perforated no sideward movement of the punching stamp carrier 66 (Fig. 4) is effected since the punches of the a-group of characters are normally always in punching line. However, if a character of the b-group is to be punched (Fig. 6), the punching stamp carrier 66 must be moved to the right (Fig. 4) while in order to perforate a character of the c-group, the punching stamp carrier must be moved to the left to adjust the punches of the c-group in punching line. This movement is effected (depending upon the actuated key) by means of a slide mechanism which will now be described.

Figure 3:
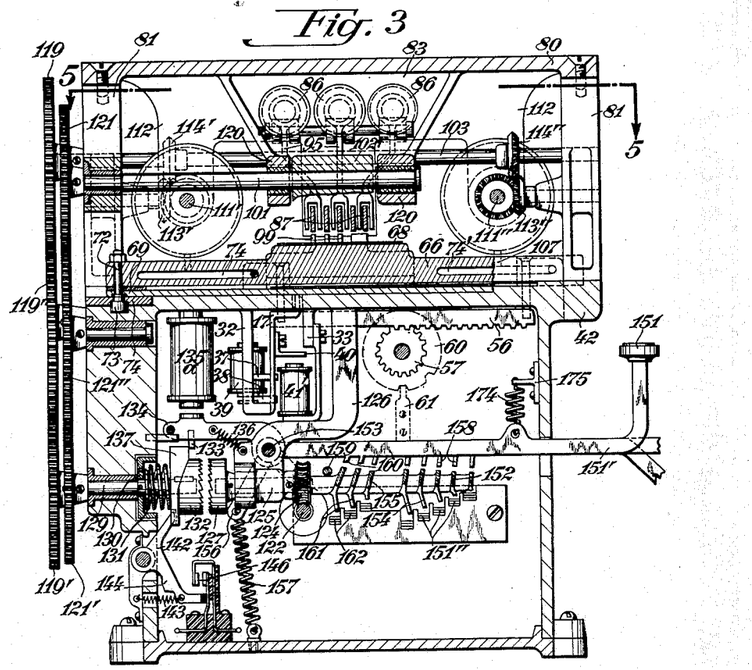
Fig. 3 is a section through the machine on line 3—3 of Fig. 1 and shows the punching keys and clutch mechanism of the machine. The scale in Fig. 3 is about $\frac{1}{10}$ larger than the scale in Fig. 1.
Figure 4:
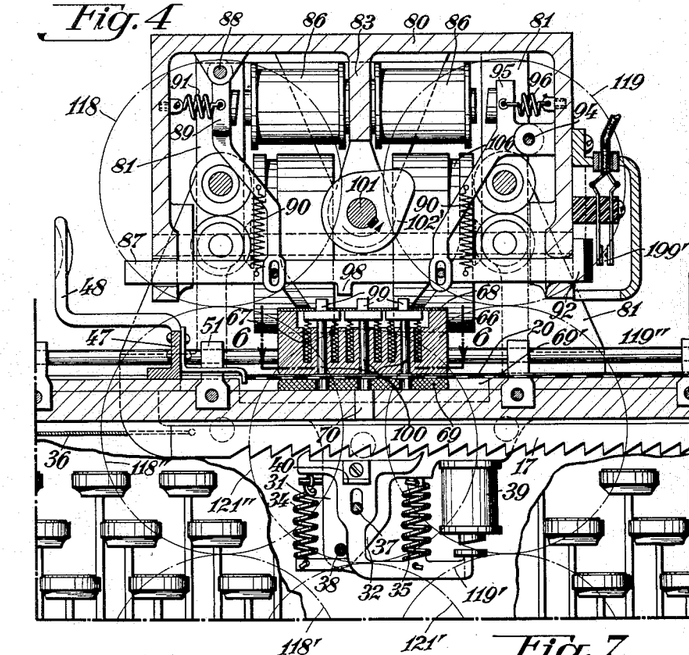
Fig. 4 is a section on line 4—4 of Fig. 2 and represents also the upper structure of the machine according to Fig. 4 which is not shown in Fig. 2. This figure represents chiefly the punching and selector mechanism; the scale in Fig. 4 is, as compared to Fig. 2, about $\frac{1}{10}$ larger in order to clearly represent all parts.
Figure 5:
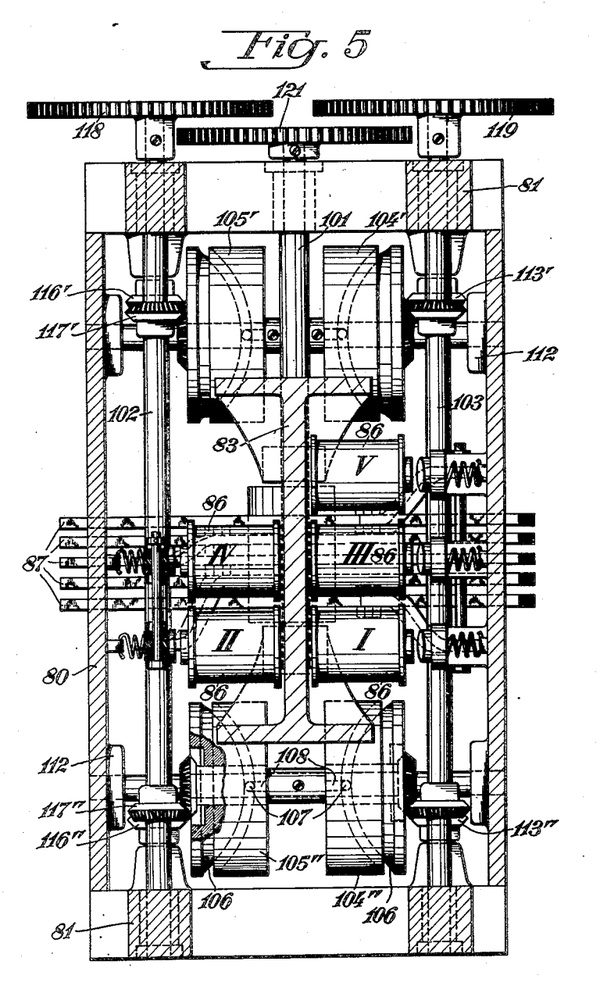
Fig. 5 is a section on line 5—5 of Fig. 3 and shows a top view of the punching stamp selector mechanism and of the slide mechanism for the stamp carrier. This figure is in the same scale as Fig. 4, however, the contact mechanism (shown in Fig. 4) which is provided on the one side of the upper structure has been omitted in Fig. 5 for reasons of simplicity.

The slide mechanism includes two pairs of slide drums 104′, 104″ and 105′, 105″ (Figs. 3, 4 and 5). All slide drums are provided with similar grooves 106, running straight in the upper half of the circumference of each drum (see Fig. 5) and being in the lower half curved to the side, said curve running in both remaining lower quarters symmetrically towards the middle as will be seen from Figs. 4 and 5. In the groove 106 of each drum engages a pin 107 (Figs. 3 and 5) fastened on the punching stamp carrier 66 so that through the curved grooves 106 and pins 107 the lateral movement of the stamp carrier 66 can be effected. As will be seen from the top view in Fig. 5 (see also Fig. 3) the curved groove 106 of each of the drums 104, 105 has an inwardly directed exit 108 which is in the rest position of the drum just opposite the pin 107. If now a movement to the left or to the right is to be effected either both drums 104 or 105 will revolve simultaneously. If we assume that the stamp carrier 66 (Fig. 4) is to be moved to the right (i. e. according to Fig. 6 the punching stamp group b must be brought in punching line) the slide drums 104′ and 104″ will be rotated once in the manner still to be described. Since (as may be seen from Fig. 4) the grooves run in the lower quarter of the drums symmetrically on the front and rear side, it is immaterial in which direction both drums rotate so that both drums can even rotate in opposite directions which will also cause the required movement of the punching stamp carrier 66. If both drums 104′, 104″ (Fig. 5) start simultaneously for rotation, the pins 107 will slide in the grooves 106 of the drums and due to the curved form of said drums during the first quarter of the rotation of the drum the stamp carrier will be moved to the right so that after the first quarter of the revolution the punching stamp group c will be in punching line. Since, however, during the rotation of the slide drums 104 the slide drums 105 are in rest position, the slide pins 107 coordinated to the drums 105 will pass from the exits 108 (Fig. 5) upon the movement of the punching stamp carrier 66 to the right so that the movement of stamp carrier 66 to the right does in no way interfere with the drums 105. Since the curved grooves 106 are straight during the second and third quarter of the revolution the punching stamp carrier will remain in rest position on the right side during this period, and during the fourth quarter of the revolution of the drums 104 the stamp carrier will again be returned by means of pins 107 to the middle normal position while the pins 107 (Fig. 5) coordinated to the drums 105 will again be moved through the exits 108 into the grooves 106 of said drums. If a character of the c-group (Fig. 6) is to be perforated, in which case the punching stamp carrier 66 must be moved to the left (Fig. 4) the drums 105', 105" (Fig. 5) will simultaneously revolve once. During the first quarter of this revolution the punching stamp carrier will be moved by means of the coordinated pins 107 to the left; during this movement the slide pins 107 coordinated to the drums 104 will pass from the coordinated exits 108 of the grooves 106 since the drums 104 are now in rest position and they will also remain in this position; during the second and third quarter of the revolution of the drums 105, the punching stamp carrier will remain in its left position due to the straight form of the groove 106, and during the fourth quarter the carrier will be returned through the groove 106 of the drums 105 to its middle normal position. The drums 104' and 105' are loosely mounted upon a common shaft 111"; the shafts 111 are fastened in sidewardly suspending lips 112 (Fig. 3) of the bridge 80. Each of the drums 104 and 105 is provided on its outwardly directed face (see Fig. 5) with a bevel gear. The bevel gears of the drums 104' and 104" are in mesh with bevel gears 113' and 113" being fastened upon a shaft which is rotatably mounted in the bridge 80. The bevel gears 113' and 113" are fastened upon journals rotatably mounted in the brackets 81 and are in mesh with bevel gears 114' and 114" which are fastened upon a shaft 103; the shaft 103 is rotatably mounted with both ends in bearings of the oppositely arranged brackets 81 (see Fig. 5). The same arrangement has been made on the left side with respect to the slide drums 105' and 105"; the bevel gears of the same are in mesh with the bevel gears 116' and 116" which in turn engage bevel gears 117' and 117" fastened upon a common shaft 102. The shafts 102 and 103 extend on the rear wall of the machine through the bracket 81 to the outside and each of them is provided with a gear 118 or 119 respectively (Fig. 5); upon each punching operation in which a movement of the punching stamp carrier must be effected one of one side of the gears 118 or 119 performs one complete revolution. The shaft 101 (Figs. 3, 4 and 5) carrying the punching cam 102' is mounted in bearings 120 (Fig. 3) of the suspending rib 83 and in the rear wall bracket 81; said shaft carries also a gear 121 fastened thereto. The cam 102' rotates in the direction indicated in Fig. 4 and is so arranged that during the first quarter of the operating cycle there is no cooperation with the bars 87. However, after the first quarter of an operating cycle has passed, the peak of the cam 102' will encounter the selector bars 87 and will press the lips of the selected bars upon the punching stamps below said lips in order to perforate the card. This operation is completed shortly after the completion of the second quarter of the cycle, and then all parts will be returned under the influence of their coordinated springs to their normal position before the beginning of the fourth quarter of the cycle.

If a character of the $a$ group is to be punched, the punching stamp carrier 66 will remain in the middle position shown in the drawings; about during the second quarter of the operating cycle the perforation of the holes is effected through the cam 102' (Fig. 4). However, if a character of the $b$-group or $c$-group is to be perforated, in addition to the shaft 101 and consequently in addition to the cam 102' also the shaft 102 or 103 will be rotated once (Figs. 4, 5) depending upon the group to which the character to be perforated belongs. The selected shaft, say for instance the shaft 102, rotates in unison with the punching shaft 101 so that during the first quarter of the operating cycle the punching stamp carrier 66 will be moved to the left through the slide drums 105' and 105", and said carrier will then remain during the second and third quarter of the operating cycle in the adjusted position. During this time i. e. during the second quarter of the cycle punching of the holes will be effected in the described manner by means of punching stamps of the selected $c$-group (as we will now assume for example) and in the third quarter the punching stamps and selector bars will return under the influence of their springs to their normal position so that during the fourth quarter of the cycle the grooves 106 of the slide drums will again return the stamp carrier to its middle position.

*Drive and clutch mechanisms*

Each of the shafts 101, 102 and 103 can be operatively connected by means of gears shown in Figs. 3, 4 and 5 with the drive shaft 122 (Figs. 1 and 3) arranged in the lower part of the machine frame, and said connections may be effected by a one-revolution clutch. As will be seen from Figs. 3, 4 and 2, the gear 119 is in mesh with the drive gear 119' over an idle gear 119"; in the same way provision has been made between the gears 118, 118", 118' and between the gears 121, 121", 121'. The gears 118', 119' and 121' are loose upon shafts mounted in the rear wall of the machine frame, said shafts being engageable with the spindle 122 by means of one-revolution clutches generally indicated at 141$a$, 141$b$ and 141$c$ in Fig. 1. Through release of the clutch 141$a$ the punching cam will be rotated; through release of one of the clutches 141$b$, 141$c$ the drive for the punching stamp carrier slide mechanism will be initiated so that either the $b$-group or $c$-group of punching stamps will be moved in punching line and in addition thereto, of course, the punching clutch 141$a$ will be released so that also the punching cam will be rotated. Since the three one-revolution clutches are substantially of the same construction only that for the punching cam shall be described more in detail in connection with Fig. 3.

All clutches are driven by a common worm gear 122 which in turn is continuously rotated by the motor 123 fastened on the right hand side of the machine frame (Fig. 1). The gear 122 is in mesh with a gear 124 (Fig. 3) fastened upon a shaft 125 which is rotatably mounted in a bearing suspending from the bridge 126. The left side of the shaft is provided with a clutch member 127 which (if the motor is switched in) will continuously rotate with the shaft 122. The drive gear 121' is fastened upon a shaft 129 on which is also fastened a socket 130 for a spring 131. The spring 131 tends to move a clutch member 132 to the right which is guided upon the shaft 129 by means of a key. Normally the clutch member 132 is held disengaged from the clutch member 127 by means of the pin 133 provided on the armature 134 of the clutch magnet 135$a$. If, however, the armature 134 is drawn upwardly by the magnet 135$a$ against the tension of a spring 136, the pin 133 will be disengaged from the flange 137 of the clutch member 132 so that the spring 131 will move the clutch member 132 to the right in engagement with the clutch member 127. Consequently, the clutch member 132 will be immediately rotated by the continuously rotating clutch member 127 and over gears 121', 121", 121 the shaft 101 will be rotated. Since the magnet 135$a$ is only instantaneously energized, the spring 136 will again draw the armature 134 downwardly immediately after the start of the clutch member 132 so that the pin will encounter the enlarged part of the flange 137; if the clutch member 132 has been rotated somewhat further the pin will again be drawn downwardly into the position shown in the drawings but it will now ride on the right hand edge of the flat part of the flange 137 since the clutch member 132 is now moved to the right. After one revolution of the clutch member 132, the cam part of the flange 137 will encounter the pin 133 so that the pin 133 will press the clutch member 132 against the action of the spring 131 out of engagement with the clutch member 127; then the parts will again be in the position shown in Fig. 3 and the shaft 129 and consequently the punching cam 102′ will have completed one full revolution.

In a similar way are one-revolution clutches 141b, 141c provided between the shaft 122 (Fig. 1) and the slide drums 104, and 105, and provision has been made in the relation of the ratio that for each clutching operation the slide drums or the punching drum respectively will always complete a single revolution. If a clutch magnet of the slide clutches 141b, 141c is energized, the clutch magnet 135a of the punching clutch will not be energized but the punching clutch will then be actuated in a mechanical way depending upon the release of one of the clutches 141b or 141c, in order to secure engagement of the clutches and simultaneous synchronous movement of all parts in punching operations where a lateral movement of the punching stamp carrier is required. For this purpose each of the armatures 134 of the clutch magnets of clutches 141b and 141c (not shown in detail) is provided with a sidewardly extending projection shown in section in Fig. 3. These projections extend from both sides beneath the armature 134 of the punching clutch; if therefore one of the clutch magnets of the clutches 141b or 141c is energized, simultaneously therewith the armature 134 of the magnet 135a will be raised without energization of the coordinated magnet. Consequently one of the slide clutches and the punching clutch will be released in the manner previously described; the punching stamp carrier will then at first be moved whereupon punching operation will be effected, and then the punching stamp carrier will again be returned by means of the slide drums to its middle normal position. To each of the three one-revolution clutches is a stop device coordinated (shown in Fig. 3) in order to arrest the mechanical parts in a certain predetermined normal position. Such a stop or arresting device comprises a pivotally mounted lever 142 which is normally drawn by a spring 143 into a notch of the flange 137 and consequently the clutch member 132 and also all parts being in operative connection with the shaft of said clutch member will be arrested in the proper normal position. If the clutch is released and if the clutch member 132 moves to the right, the lever 142 will be turned by the spring 143 in clockwise direction until the lip 144 encounters the machine frame and then the upper arm of the lever 142 slides upon the left face of the clutch flange 137 which is now in the right hand position. As soon as the clutch member 132 is again moved to the left due to the cam form of the flange 137 and by means of the pin 133, the lever 142 will immediately arrest the clutch member 132 in its normal position under the influence of the spring 143. Such an arresting mechanism is coordinated to each of the clutches 141a, 141b and 141c (Fig. 1); however, to the clutch 141a also the contact shown in Fig. 3 is coordinated. Said contact comprises a normally open plate contact 146 which is held by the lower arm of lever 142 in open position. If, however, the clutch is released and if the spring 143 turns the arm 142 slightly in clockwise direction, the contact 146 will close and will remain closed until the clutch members 127 and 132 are again disengaged.

Key mechanism

Figure 7:
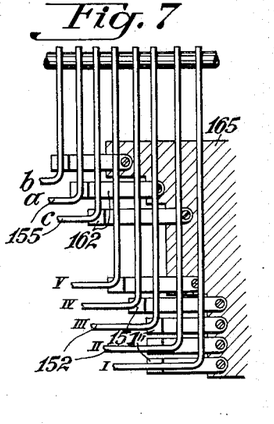
Fig. 7 shows a top view of the selector contacts being actuated by the key controlled frame. This figure is on the same scale as Figs. 4–6.

The machine is provided with letter and numeral keys 151 (Figs. 1, 3 and 8) which are adapted to control the perforation electromagnetically as will now be described. As has been already mentioned, the characters to be perforated are divided in three different groups i. e. in an $a$, $b$ and $c$-group; for the letters there are five and for the numerals there are only three hole positions necessary which can be perforated under the control of the keys either singly or in different combinations. As will be seen from Figs. 3 and 8, five control frames 152 are provided which are rotatably mounted upon the shaft 153 (see also Fig. 1). To said control frames 152 are corresponding controlling contacts 151″ (Figs. 3 and 7) coordinated which are normally open and which are controlled by the downwardly directed noses 154 provided on the side of the control frames 152; the contacts will be closed if the control frames are moved downwardly in clockwise direction (Fig. 3). In addition to the before mentioned control frames 152 there are three control frames 155 provided being also rotatably mounted upon the shaft 153. The control frames 152 are drawn in clockwise direction in the same way as the control frames 155 by means of springs 157 against a stop 159, said springs engaging arms extending to the left beyond the shaft 153. The frames 152 nearly engage the noses 158 provided on the lower side of the keys 151 while there is a certain distance between the control frames 155 and the noses 160 of the keys 151. The control frames 155 are provided on the right hand side with downwardly extending noses 161 to which are contacts 162 coordinated. The contacts 151″ and 162 are fastened in stepped relation upon an insulating block 165 provided within the machine on the right hand side of the same as will be clearly seen from Figs. 1, 3 and 7. The control frames 155 and the contacts 162 correspond to the above mentioned three groups $a$, $b$ and $c$ characters, and should therefore be named according to Fig. 3 in the sequence from the left to the right in accordance with the groups of characters by $b$, $a$, $c$ (see Fig. 8); however, for reasons of clarity, the corresponding reference numbers have been omitted in the drawings. Now, all keys which belong to the $a$-group of characters are provided with a nose 160a while the keys of group $b$ have a nose 160b and the keys of group $c$ have a nose 160c as will be clearly seen from the diagram in Fig. 8. In addition thereto, the key levers 151′ (Figs. 3 and 8) are provided with different combinations of noses 158 in accordance with the perforation scheme shown in Fig. 10. These noses are provided on the same positions on which according to the scheme in Fig. 10 holes shall be provided; in connection herewith, it is immaterial if adjacent positions are to be perforated by single positional holes or by elongated holes. For instance, the letter key "A" which shall perforate according to Fig. 10 only the IV-position is provided only above the frame 152—IV (Fig. 8) with a nose 158, and since this character belongs according to Fig. 11 to the b-group of characters, this key is also provided above the frame 155b (see Fig. 8) with a control nose 160b. The letter key "E" which shall control punching of an elongated hole occupying both hole positions IV and V is provided above each of the IV and V frames 152 with a nose 158. Since, however, this character belongs to the a-group, the "E"-key has also a nose 160a. The arrangement of the noses 158 and 160 as well as the cooperation with the corresponding control frames 152, 155 and with the control contacts 162 and 151'' will be clearly seen from Figs. 3, 7 and 8. Depending upon the arrangement of the above mentioned control noses on the keys, each time a key is depressed only one of the frames 155 will be depressed and depending upon the meaning of the depressed key the frames 152 will be depressed singly or in different combinations so that upon each depression one of the contacts 162 and one or a plurality of the contacts 151'' will be closed.

In addition to the above mentioned numeral and letter character keys there is also a carriage shift key 170 and a carriage release key 171 (Figs. 3 and 8) provided. The shift key 170 controls a contact 173 being parallelly arranged to the contact 145 which is normally under the control of the clutch mechanism. If the shift key 170 is depressed, the contact 173 will be closed and the carriage shift magnet 39 will be energized so that the carriage will be shifted without a simultaneous perforation. The release key 171 controls the contact 172 which closes the circuit of the release magnet 41 in order to completely release the carriage in the previously described manner. The keys 151 as well as the shift and the release key are normally drawn upwardly by springs 174 (Fig. 3) fastened on an angle 175 so as to hold the keys in the position shown in Fig. 3. Upon depression of a key, at first the noses 158 will move the frames 152 downwardly and simultaneously therewith the coordinated contacts 151'' will be closed; about after half of the downward way of the keys the noses 160 will encounter the frames 155 and will close the contacts 161 until the keys 151 reach their lowermost position so that the selected contact 162 will also be closed somewhat later than the contacts 151''. The described frame arrangement for the control of the contacts may, of course, also be replaced by known selector bars being provided with different notches and being moved either singly or in different combinations laterally to the key levers under the control of the same whereby coordinated contacts will be closed.

*Circuit diagram*

Figure 8:
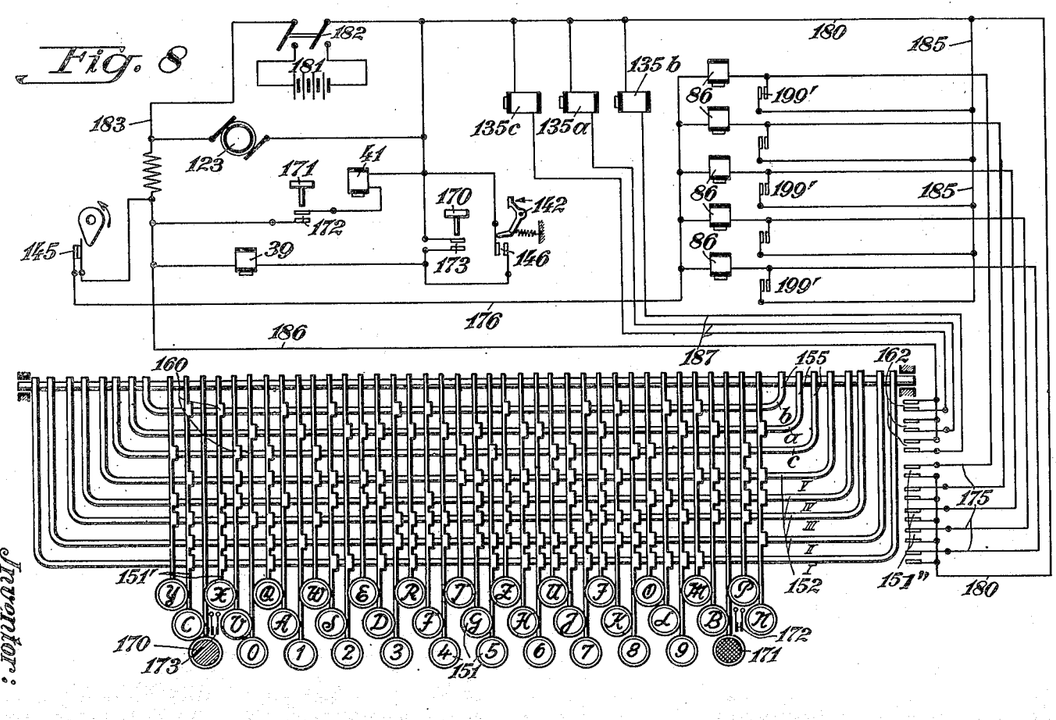
Fig. 8 shows the electrical connections of the machine, the key mechanism is diagrammatically indicated.

The electrical connections of the described parts may be seen from the circuit diagram in Fig. 8. The key and frame arrangement shown therein has already been explained so that only reference to the electrical connections will be made. The contacts 151'' controlled by the frames 152 are all connected by a common line 180 to the right hand side of the current source 181 if the main switch 182 is closed. From the contacts 151'' lead lines 175 to the selector magnets 86 of the same positional coordination, said magnets being connected to a common back line 176 leading over the contact 145 and being in turn connected to the left side 183 of the current source. The contact 145 is normally closed and opens instantaneously shortly before the end of each punching cycle; the contact 145 is controlled by a cam 145' (not shown in the remaining figures) which rotates synchronously with the punching clutch in order to interrupt the stick circuits of the selector magnets as will still be described. To the selector magnets 86 are the contacts 199' (Fig. 4) connected which are in turn connected by a common line 185 (Fig. 8) to the line 180. The contacts 162 are on the one hand connected to a common line 186 leading to the left hand side of the current source, and on the other hand through separate lines 187 to the clutch magnets 135c, 135a and 135b which are then connected to the right hand side 180 of the current source. These clutch magnets serve in the above described manner for the release of the one-revolution clutches 141c, 141a, 141b (Fig. 1). If a key is depressed, at first the coordinated contacts 151'' will be closed and consequently thereof a current circuit will be established from the line 180 over the contacts 151'', the corresponding lines 175, the selector magnets 86 and line 176 so that the selector magnets will become energized and will move their coordinated selector bars 87 (Fig. 4) thereby closing the contacts 199'. Through these contacts 199' (Fig. 8) the current supply to the energized selector magnets 86 will be maintained over the line 185 even if the depressed key has again returned to its home position and if consequently thereof the contacts 151'' have opened. Shortly after the energization of the selector magnets 86 also one of the clutch contacts 162 will be closed and the corresponding clutch magnet 135 will be energized over the coordinated line 187. By energization of one of said magnets only the clutch 141a or simultaneously the clutches 141b—141a or 141c—141a respectively (Fig. 1) will be engaged so that the previously described operations will be initiated. However, simultaneously with the engagement of the clutch the contact 146 will be closed which prepares the carriage shifting operation and which remains closed until the punching clutch has again been disengaged. Then also the contact 146 will open and consequently thereof the carriage will be shifted for one record column. The stick circuits of the magnets 86 established over the contacts 199' will be interrupted (as has been mentioned) by the contact 145 towards the end of the punching cycle so that then also the selector bars will return in horizontal direction to their normal position. It will be seen that even in case that a key has been depressed inadvertently or for some other reason longer than one operating cycle, the clutch would perform a plurality of revolutions, but no shifting of the carriage can occur so that the punching stamps would only repeatedly be depressed on the same positions.

The motor 123 is directly connected to the current circuit 181 and is therefore continuously rotating if the machine is switched in while the perforating operations proper are controlled by the above described key mechanism.

*Operation of the machine*

If the card carriage is in the extreme left hand position in which case the stops 66 engage the stops 65 (Fig. 2), a blank card is inserted in the carriage by moving the right hand end of the card between the punching stamp carrier 66 and the matrix plate 69 (Fig. 4) so that the right and the left edges of the card are engaged by the guide fingers 44 (Fig. 2). Thereupon the carriage is moved together with the card to the extreme right hand position in which position the first record columns of all decks are just in punching line. If now at first the uppermost deck of the card is to be perforated, the card is shifted by means of hand-wheel 59 (Fig. 1) and guide fingers 51 (Fig. 2) to the lowermost position if the deck selecting frame is not already adjusted in this position. Thereupon column by column perforation of the upper deck of the card may be effected. Upon depression of a key in the previously described manner the selector magnets will be energized and through a clutch magnet 135 (Fig. 8) the corresponding clutch 141 (Fig. 1) will be engaged. If the depressed key belongs to the $a$-group of characters, the stamp carrier will remain in its rest position so that during the first quarter of the operating cycle no operations will take place. It is only during the second quarter of the operating cycle that perforation will be effected in one or a plurality of hole positions by means of the punching stamps of the $a$-group (Fig. 6) being actuated in accordance with the energized selector magnets by the above described punching cam. It will be seen that upon perforation of a character of the $a$-group, only the lower three positions can be perforated by single positional punches 100′ while both upper hole positions IV and V can only be perforated by means of double-positional punches 100″ occupying both positions and being adapted to produce an elongated hole. For this reason, of course, all keys of the $a$-group, as far as the positions IV and V are to be punched at all, are provided with noses 158 (Fig. 3) on both positions. If, however, a character of the $b$- or $c$-group is perforated, a clutch magnet 135$b$ or 135$c$ (Fig. 8) will be energized. However, through the energization of one of these clutch magnets the clutch of the punching clutch magnet 135$a$ which has not been energized will simultaneously be engaged in the above described manner so that now the slide mechanism (Figs. 3, 5) for the punching stamp carrier as well as the punching mechanism will become operative. During the first quarter of the operating cycle the stamp carrier will then be moved in the above described manner at first to the side in order to adjust the selected stamp group ($b$ or $c$) in punching line. Depending upon the actuated key also the selected selector magnets will be energized in accordance with the character to be perforated, and if then during the second quarter of the operating cycle the punching cam depresses the adjusted selector slides, a perforation will be produced representing the meaning of the depressed key; during the remainder of the operating cycle the punching stamp carrier and all other parts will return in the described manner to their normal position. If the upper deck has been perforated in the described manner column by column and if then the carriage has again arrived in its extreme left hand position, the middle deck may be adjusted for perforation by means of the hand-wheel and the carriage will again be moved to the right so that perforation can then be effected in a similar way as in the upper deck, with the only difference that always only the three lower hole positions are punched and consequently only the corresponding punching stamps of the $a$, $b$ and $c$ group are used for the perforation. If the perforation of the middle deck is completed, the card may be shifted to its upper position and the carriage will again be moved to the right whereupon perforation of the lower deck can be effected column by column.

While there have been shown and described and pointed out the fundamental novel features of the invention as applied to a single modification it will be understood that various omissions and substitutions and changes in the form and details of the machine illustrated and in its operation may be made by those skilled in the art without departing from the spirit of the invention. It is the intention therefore to read the following claims in the light of this understanding.

What I claim is:

1. In a punching machine for perforated records, punches adapted to control a predetermined number of hole positions of said record to produce thereon distinct perforated controlling characters represented by single-positional and plural-positional holes and by combinations thereof, said punches controlling a lower number of hole positions than the theoretical minimum number of holes positions required when only single-positional holes are used for the same number of distinct controlling characters, and means for governing said punches in accordance with said distinct controlling characters.

2. In a punching machine for perforated records, punches adapted to control three hole positions of said record to produce thereon any one of at least ten distinct perforated controlling characters by single-positional and plural-positional holes and combinations thereof, and means for governing said punches in at least ten distinct modes.

3. In a punching machine for perforated records, punches adapted to control five hole positions of said record to produce thereon any one of at least thirty-six distinct perforated controlling characters by single-positional and plural-positional holes and combinations thereof, and means for governing said punches in at least thirty-six distinct modes.

4. In a punching machine for perforated records, punches adapted to control five hole positions of said record to produce thereon any one of at least thirty-six distinct perforated controlling characters, said punches including punches to control three of said five hole positions to produce thereon any one of at least ten of said thirty-six distinct perforated controlling characters and being adapted to produce said controlling characters by single-positional and plural-positional holes and combinations thereof, and means for governing said punches in at least thirty-six modes.

5. In a punching machine for perforated records, a set of a predetermined number of actuating members such as for instance keys, a common set of punches adapted to produce single-positional and plural-positional holes and combinations thereof within a predetermined number of hole positions, the number of hole positions governed by said punches being less than the theoretical minimum number of hole positions required when only single-positional holes are used for the distinct representation of a number of perforated characters corresponding to said predetermined number of actuating members, and means for distinctly controlling said punches governing said predetermined number of hole positions by said predetermined number of actuating members.

6. In a punching machine for perforated records, a set of at least ten actuating members such as for instance keys, a common set of punches adapted to produce single-positional and plural-positional holes and combinations thereof within three hole positions, and means for distinctly controlling said punches governing three hole positions either singly or in different combinations by said set of at least ten actuating members.

7. In a punching machine for perforated records, a set of at least thirty-six actuating members such as for instance keys, a common set of punches adapted to produce single-positional and plural-positional holes and combinations thereof within five hole positions, and means for distinctly controlling said punches governing five hole positions either singly or in different combinations by said set of at least thirty-six actuating members.

8. In a punching machine for perforated records, a set of at least thirty-six actuating members such as for instance keys, a common set of punches adapted to produce single-positional and plural-positional holes and combinations thereof within five hole positions, and means for distinctly controlling said punches governing five hole positions either singly or in different combinations by said set of at least thirty-six actuating members, at least ten of said actuating members distinctly controlling punches governing three of said five hole positions.

9. In a punching machine for perforated records, single-positional punches and plural-positional punches adapted to control a predetermined number of hole positions of said record to produce thereon distinct perforated controlling characters represented by individual holes or hole combinations, said punches controlling a lower number of hole positions than the theoretical minimum number of hole positions required when only single-positional holes are used for the same member of distinct controlling characters, and means for governing said punches in accordance with said distinct controlling characters.

10. A machine as specified in claim 9 wherein the plural-positional punches occupy not more than two single hole positions.

11. A machine as specified in claim 9 wherein said punches comprise single-positional punches of circular section and solid plural-positional punches of uninterrupted elongated section.

12. In a punching machine for perforated records, a set of a predetermined number of actuating members such as for instance keys, a common set of single-positional punches and plural-positional punches adapted to produce individual and combinational holes within a predetermined number of hole positions, the number of hole positions governed by said single-positional and plural-positional punches being less than the theoretical minimum number of hole positions required when only single-positional holes are used for the distinct representation of a number of perforated characters corresponding to said predetermined number of actuating members, and means for distinctly controlling said punches governing said predetermined number of hole positions by said predetermined number of actuating members.

13. A machine as specified in claim 12, wherein only a single plural-positional punch is operated upon the actuation of any actuating member of those actuating members controlling only plural-positional punches or in combination therewith single-positional punches.

14. In a punching machine for perforated records a predetermined number of actuating members such as keys, a common set of single-positional and plural-positional punches adapted to produce single-positional and plural-positional holes and combinations thereof within a predetermined number of hole positions, the number of hole positions governed by said punches being less than the theoretical minimum number of hole positions required when only single positional punches are used for the distinct representation of a number of perforated characters corresponding to said predetermined number of actuating members, said set of punches comprising a plurality of groups of punches, each of said groups of punches corresponding to a predetermined group of said actuating members, and means for automatically selecting upon actuation of an actuating member the group of punches which corresponds to the actuated member and means for distinctly controlling the punches of said selected group in accordance with the actuated member of the respective group of actuating members.

15. In a machine as specified in claim 14, a set of punch selectors, one selector being provided for each hole position, said set of punch selectors being in operative connection with said set of actuating members and being adapted to control selectively any one of said group of punches.

16. In a punching machine for perforated records, a predetermined number of actuating members such as keys, a common set of single-positional and plural-positional punches adapted to produce single-positional and plural-positional holes and combinations thereof within a predetermined number of hole positions, the number of hole positions governed by said punches being less than the theoretical minimum number of hole positions required when only single-positional punches are used for the distinct representation of a number of perforated characters corresponding to said predetermined number of actuating members, said punches being mounted in three adjacent groups on a punch carrier unit including also a matrix plate, means for feeding the record card upon actuation of an actuating member column by column between said punches and the matrix, the middle group of the punches governing normally the record column in punching position and the punch carrier unit being movable to the right and the left to adjust one of the outer groups of punches on the record column being in punching position, each group of said punches being governed by a predetermined group of said actuating members, means for automatically moving one of the outer group of punches to punching position upon actuation of an actuating member of a group of actuating members corresponding to the respective outer group of punches and for maintaining the middle group of punches in punching position if an actuating member of the group of members corresponding to the middle group of punches is actuated, and means for distinctly controlling the punches of the selected group in accordance with the actuated actuating member of the respective group of actuating members.

17. A machine as specified in claim 16 having at least ten actuating members for producing at least ten distinct perforated characters within only three hole positions, wherein the middle group of punches comprises three single-positional punches, wherein the one outer group comprises one single-positional punch for the first hole position of a column and one double-positional punch for the second and third hole position whereas the opposite outer group of punches comprises one double-positional punch for the first and second hole position and one single-positional punch for the third hole position of a column.

18. A machine as specified in claim 16 having at least thirty-six actuating members for producing at least thirty-six distinct perforated characters within only five hole positions wherein the middle group of punches comprises single-positional punches for the first, second and third hole position and one double-positional punch for the fourth and fifth hole position, and wherein the one outer group comprises one single-positional punch for the first hole position, one double-positional punch for the second and third hole position and one single-positional punch for each the fourth and fifth hole position, whereas the opposite outer group of punches comprises one double-positional punch for the first and second hole position and one single-positional punch for each the third, fourth and fifth hole position.

19. A machine as specified in claim 16 having at least thirty-six actuating members for producing at least thirty-six distinct perforated characters within only five hole positions, wherein the middle group of punches is under the control of more actuating members than each of the two outer groups of punches.

20. A machine as specified in claim 16 having thirty-six actuating members for producing at least thirty-six distinct perforated characters within only five hole positions, wherein the middle group of punches is under the control of fourteen actuating members while each of the two outer groups of punches is under the control of eleven actuating members.

MICHAEL MAUL.